United States Patent
Ah Kun et al.

(10) Patent No.: US 10,346,618 B1
(45) Date of Patent: Jul. 9, 2019

(54) DATA ENCRYPTION FOR VIRTUAL WORKSPACES

(71) Applicant: Amazon Technologies, Inc., Reno, NV (US)

(72) Inventors: Malcolm Russell Ah Kun, Kirkland, WA (US); Anshuk Chakraborty, Seattle, WA (US); Gopala Krishna Ambareesh, Bellevue, WA (US); Nakul Namdeo Dhande, Seattle, WA (US); Nathan Bartholomew Thomas, Bellevue, WA (US); Zhenghong Sun, Seattle, WA (US); Prasanna Subash, Kenmore, WA (US); Salman Aftab Paracha, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 287 days.

(21) Appl. No.: 15/469,367

(22) Filed: Mar. 24, 2017

(51) Int. Cl.
| | |
|---|---|
| G06F 21/62 | (2013.01) |
| H04L 29/06 | (2006.01) |
| G06F 21/60 | (2013.01) |
| H04L 9/08 | (2006.01) |
| G06F 3/06 | (2006.01) |
| G06F 12/14 | (2006.01) |

(52) U.S. Cl.
CPC .......... *G06F 21/602* (2013.01); *G06F 3/065* (2013.01); *G06F 3/067* (2013.01); *G06F 3/0623* (2013.01); *G06F 3/0631* (2013.01); *G06F 3/0664* (2013.01); *G06F 12/1408* (2013.01); *H04L 9/0861* (2013.01); *H04L 63/08* (2013.01); *H04L 63/10* (2013.01); *G06F 2212/402* (2013.01)

(58) Field of Classification Search
CPC . G06F 21/70; G06F 3/06; G06F 9/455; G06F 2212/402; H04L 63/10
See application file for complete search history.

(56) References Cited

U.S. PATENT DOCUMENTS

| | | | |
|---|---|---|---|
| 9,892,265 B1* | 2/2018 | Tripathy | G06F 21/602 |
| 2007/0239859 A1* | 10/2007 | Wilkinson | G06F 9/505 709/220 |
| 2010/0199042 A1* | 8/2010 | Bates | G06F 11/2064 711/114 |
| 2018/0095739 A1* | 4/2018 | Baset | G06F 8/60 |

* cited by examiner

*Primary Examiner* — Izunna Okeke
(74) *Attorney, Agent, or Firm* — Hogan Lovells US LLP (57) ABSTRACT

Virtual workspaces can be provided using shared resources and network-attached storage. A workspace accessed under a customer account has a unique key generated using a combination of a customer master key and an encryption context. The encryption context is specific to the workspace, such as may include a hash of specific values for the workspace. When a new instance is generated, a first data volume is generated using a machine image and data snapshot encrypted under a current encryption key. The snapshot is copied to a new snapshot, and a new encryption key obtained that is based on the customer master key and the current encryption context. The snapshot is used to create a new data volume encrypted under the new encryption key. The new volume is attached to the workspace instance such that data transmitted between the workspace and the new volume is encrypted under the volume-specific encryption key.

20 Claims, 6 Drawing Sheets

DATA ENCRYPTION FOR VIRTUAL WORKSPACES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some systems users are able to access private workspaces or virtual desktops that are provided using these resources. While the data for these workspaces can be encrypted, the encryption is typically performed using keys that must be managed by the customers, and must be shared between workspaces for a given customer, which can provide the opportunity for data loss if an encryption key is compromised.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to encrypting data in a network environment. In various embodiments, users can utilize workspaces or other virtual environments to perform a variety of tasks. The workspaces can be provided using shared resources that are allocated as appropriate, as may include virtual machines and block-based storage volumes. Because the workspace is using network-attached storage, it can be desirable to automatically encrypt the data. In order to provide enhanced security, as well as to minimize the management requirements for customers, volume-specific encryption keys can be automatically generated and used to encrypt the data for the volume. A workspace accessed under a customer account can have a unique key generated for each data volume, or workspace instance, using a combination of a customer master key and an encryption context. The encryption context can be specific to the workspace, such as may include a hash of specific values for the workspace. When a new instance is generated, a first data volume is generated using a machine image and data snapshot that is encrypted under a current encryption key. The snapshot can be copied to a new snapshot, and as part of the copy process a new encryption key can be obtained that is based on the customer master key and the current encryption context. The snapshot can be used to create a new data volume encrypted under the new encryption key, and the new volume attached to the workspace instance instead of the first data volume, such that data transmitted between the workspace instance and the data volume can be encrypted under the volume-specific data encryption key. The creation of a new storage volume, encrypted under the new key, and a new workspace instance enables all data to be encrypted under the new volume-specific data encryption key without any need for the prior encryption key, which may have been compromised and could otherwise allow for unauthorized access to data of the new workspace instance.

Various other such functions can be used as well within the scope of the various embodiments as would be apparent to one of ordinary skill in the art in light of the teachings and suggestions contained herein.

Figure 1:
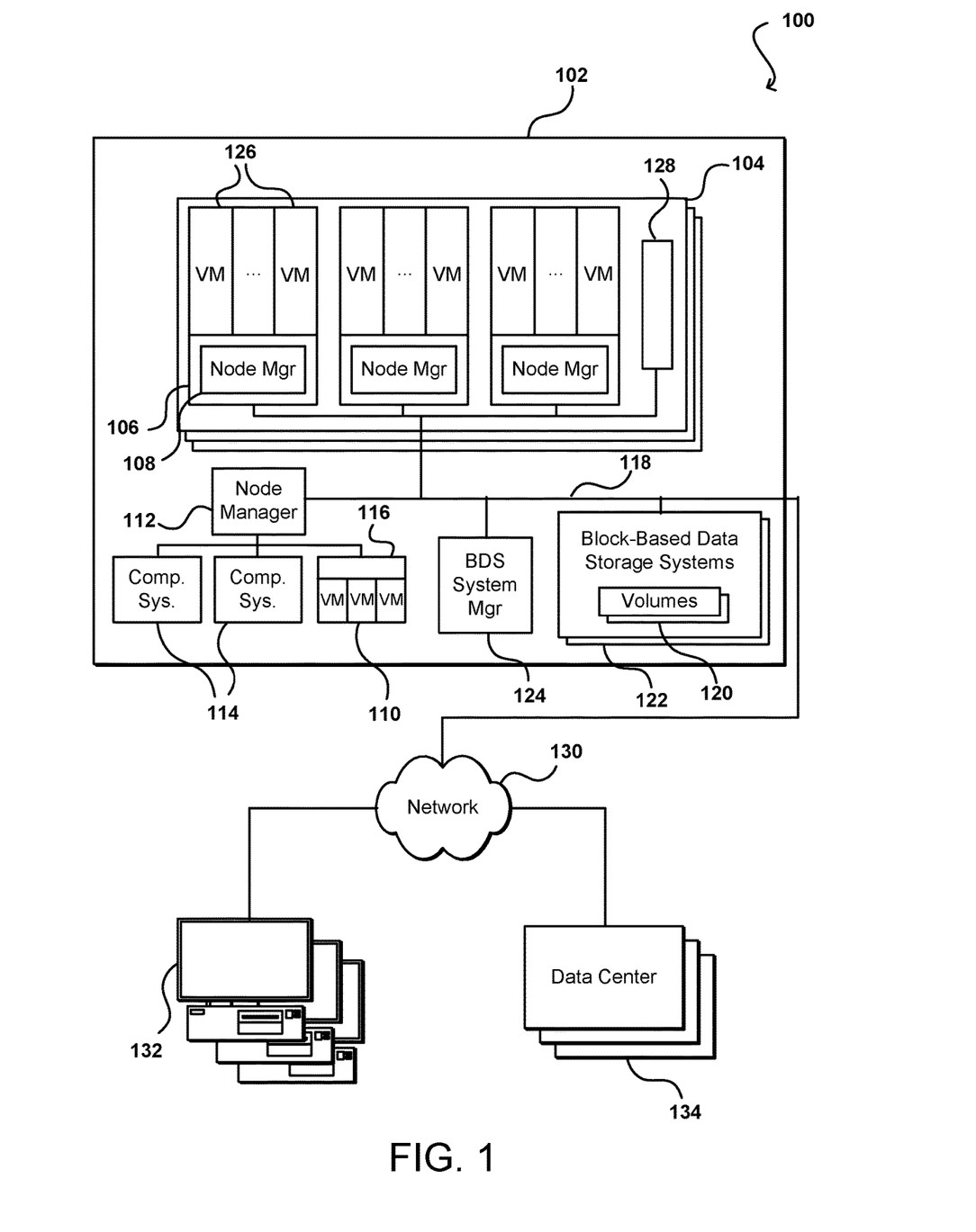
FIG. 1 illustrates an example environment in which aspects of the various embodiments can be implemented.

FIG. 1 illustrates an example network configuration 100 in which computing and data access operations can be performed, along with other such functionality, in accordance with various embodiments. This configuration can include components offered as part of a multi-tenant environment, or resource provider environment 102, wherein the components are provided by a resource provider, and customers pay for access and/or utilization of respective portions of those resources. In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a block-based data storage system or service. The service can utilize a pool of multiple block-based data storage systems, which each have local block-based storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the block based data storage systems. This is referred to herein as the instance being "attached" to the storage volume(s). In this example configuration, multiple computing systems are operable to execute various programs, applications, and/or services, and further operable to access reliable block-based data storage, such as under the control of a block-based data storage service. A block-based data storage service can use multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 102 includes a number of racks 104, each rack including a number of host computing devices 106, as well as an optional rack support computing system 128 in this example embodiment. The host computing systems 106 on the illustrated rack 104 each host one or more virtual machines 126 in this example, as well as a distinct node manager module 112 associated with the virtual machines on that host computing system to manage those virtual machines. One or more other host computing systems 116 may also each host one or more virtual machines 110 in this example. Each virtual machine 110 may act as an independent resource node for executing one or more program copies or performing another such action or process for user data requests, I/O operations, etc. In addition, this example data center 102 further includes additional host computing systems 114 that do not include distinct virtual machines, but may nonetheless each act as a resource node for one or more tasks being executed for a user. In this example, a node manager module 112 executing on a computing system (not shown) distinct from the host computing systems 114 and 116 is associated with those host computing systems to manage the resource nodes provided by those host computing systems, such as in a manner similar to the node manager modules 108 for the host computing systems 106. The rack support computing system 128 may provide various utility services for other computing systems local to its rack 104 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 102 also includes a computing system 124 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 134, or other remote computing systems 132 external to the data center). In particular, in this example the data center 102 includes a pool of multiple block-based data storage systems 122, which each have local block-based storage for use in storing one or more volume copies 120. Access to the volume copies 120 is provided over the internal network(s) 118 to programs executing on various resource nodes 110 and 114. As discussed in greater detail elsewhere, a block-based data storage system manager module 124 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 122 may coordinate with the node manager modules 112, 108 to manage use of volumes by programs executing on associated resource nodes, while in other embodiments the node manager modules may not be used to manage such volume use. In addition, in other embodiments, one or more BDS system manager modules 124 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 122 (e.g., in a peer-to-peer manner, without any separate centralized BDS system manager module on a computing system 124).

In this example, the various host computing systems, server block data storage systems, and computing systems are interconnected via one or more internal networks 118 of the data center, which may include various networking devices (e.g., routers, switches, gateways, etc.) that are not shown. In addition, the internal networks 118 are connected to an external network 130 (e.g., the Internet or another public data network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 134 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the block-based storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 1 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 1, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume may not be able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

As mentioned, resources such as virtual machine instances can be allocated as needed to provide various user functionality. This can include, for example, the providing of virtual desktops or other types of virtual workspaces that can be accessed by one or more authorized users having the appropriate credentials to access a given workspace. A workspace as used herein can refer to a desktop computing service offered to customers across a network, such as the internet. Such workspaces, such as those offered as part of the Amazon Web Services (AWS) suite of services, can enable users to access, store, and work with documents, applications, and computing resources from various devices located at various possible locations. In conventional approaches, a customer having an account under which the workspace is allocated would have to manage the keys for the various users and workspaces. In many instances, keys or other access credentials would be shared across workspace instances for ease of management and other such purposes. The reuse of these keys exposes the data and resources to unauthorized access, however, as a compromised credential can be used to access a workspace or other offering accessible using that credential.

Accordingly, approaches in accordance with various embodiments can manage the encryption of all workspaces for a customer account, as well as the data volumes supporting those workspaces, without interaction with the customer. In at least some embodiments, the encryption may be performed automatically such that the customer may not even be aware that the various volumes are being encrypted. A master key can be maintained for a specific customer using a key management service or other trusted source. The master key can be used to generate security credentials, such as data encryption keys, that can be used to encrypt the volume data travelling across a network between a customer workspace instance and a network-attached storage volume used for the workspace. The encryption in such an approach can be performed in a way that is transparent to the underlying operating system. Even though the key is managed by the key management service, the key will still be owned by the customer and not the workspace service or workspace manager. Such an approach can prevent the service from being able to accidentally share an encrypted snapshot or other data object with another customer or entity.

Figure 2:
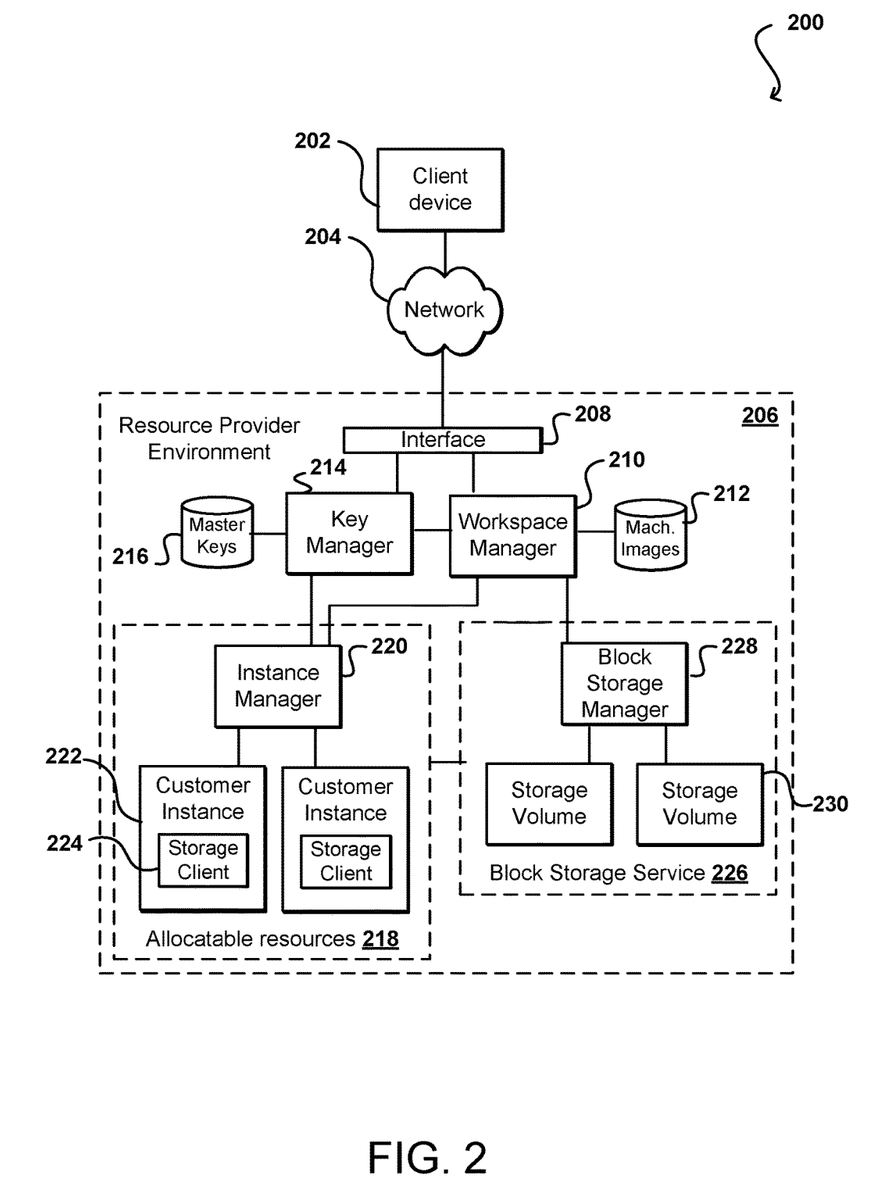
FIG. 2 illustrates components of an example workspace management service that can be utilized in accordance with various embodiments.

FIG. 2 illustrates an example workspace environment 200 that can be implemented in accordance with various embodiments. In this example, a user wanting to access a workspace can utilize a client device 202 to submit a request (via a console or API) over at least one network 204 to be received to an interface layer 208 of a resource provider environment 206, service provider environment, or other shared-resource or multi-tenant environment as discussed herein. Information for the request can be directed to a workspace manager 210 which can manage workspaces for various customers having accounts with the resource provider. The workspace manager can work with an instance manager 220, or resource manager or node manager as discussed elsewhere herein, to cause a customer instance 222, such as a virtual machine instance, to be allocated to support the workspace. The workspace manager 210 in this example can also work, directly or indirectly, with a block storage manager 228 of a block storage service 226 to allocate a storage volume 230 to be used to store data for the allocated workspace. A storage client 224 executing as part of the workspace on the customer instance 222 can cause data to be transmitted between the customer instance 222 and the corresponding storage volume 230. Although a block storage service 226 is discussed in this example, it should be understood that various other types of storage can be utilized as well within the scope of the various embodiments.

In various embodiments the data storage volume 230, and data transmitted between the storage client 224 and storage volume 230, can be encrypted by default as part of the workspace service. In other embodiments a customer or other entity may select whether or not to perform such encryption. As mentioned, the encryption can be performed independent of, or without knowledge on the part of, the underlying operating system for the customer instance 222. Upon setting up a workspace account or service for a specific customer, a key manager 214 or other key management service can generate a master key specific to that customer, that can be stored to a master key data store 216 or other such location. In this example the customer master key is not exported or available outside the key management service. The master key will be maintained by the key manager 214 and used to generate individual data encryption keys to be used with the various workspaces. There can be a separate data encryption key generated for each workspace associated with a customer account. As mentioned, there may be multiple users under a customer account, such as employees of a company having an account with the resource provider. There can be a single master key for that company, and that master key can be used to generate workspace-specific data encryption keys for the workspaces provided for the associated users.

In various embodiments, a specific data encryption key can be generated, using the customer master key, for each authorized user or each workspace corresponding to a customer account. In at least some embodiments discussed herein, unique data encryption keys are generated for each storage volume 230 or instance of a workspace. Thus, if there are thirty users under a customer account with thirty different storage volumes then there will be thirty different data encryption keys used that are all generated using the customer master key via the key manager 214. If a workspace for a specific user is rebuilt, or a new customer instance 222 is otherwise allocated to provide the workspace, a key data encryption key will be generated for that new instance and data volume.

In the example of FIG. 2, a workspace instance is generated by having the workspace manager 210 contact an instance manager 220 for the allocatable resources 218 to have a customer instance allocated. The workspace manager 210 can provide a machine image, stored in a machine image repository 212 or other such location, that can contain the metadata needed to build the storage volume for the workspace. For example, a machine image may contain an operating system and any additional software required to deliver a service or a portion of the service. The machine image can include a pointer to a default kernel identifier instead of a kernel image, and can include additional information useful in creating a virtual machine instance, as may include configuration metadata and a link to a data snapshot for a corresponding data volume, among other such options as discussed elsewhere herein. The instance manager can determine, or initialize, a virtual machine instance having the appropriate characteristics and capacity, and can cause a corresponding storage volume 230 to be generated using the information from the machine image. Since the workspace manager 210 will have access to the existing data encryption key, the block storage manager can leverage the access under that key to also grant access so the block storage service 226 can decrypt and encrypt the data online. The storage client 224 for the workspace will not store a copy of the key, but can store one or more access criteria or credentials such that the storage client 224 can call into the key manager 214 to obtain the relevant key(s). The metadata in at least some embodiments can include a link to a data snapshot for the workspace, where the snapshot is encrypted under an existing data encryption key, such as was generated with respect to the snapshot. In some embodiments the new customer instance can be launched initially using the prior data encryption key for that workspace, but in at least some embodiments it can be desirable to avoid any usage of a prior encryption key that may have been compromised. The machine image itself may be unencrypted, or may be encrypted using yet another key or credential, which may also be derived from the customer master key. The customer instance 222 can be launched using the machine image, and a storage volume generated using the snapshot and the associated data encryption key. The workspace manager 210 can communicate with the key manager 214 to have a new data encryption key generated based on the customer master key. A second storage volume 230 can be allocated using a copy of the snapshot, but that is encrypted under the second, or new, data encryption key. In some embodiments the new key creation is triggered through the snapshot copy operation. Once the new storage volume 230 is created using the copy of the snapshot and encrypted using the new data encryption key, the volumes are swapped such that the new storage volume 230 is connected to the customer instance 222 and the initial volume can be deleted or cleared and that volume made available for other use. The storage client 224 can be provided with the new external key such that the customer instance 222 executing the workspace can automatically encrypt data transmitted to the storage volume and decrypt data received from the storage volume. In this way, the new volume used for the new workspace is never encrypted under a prior workspace key which could have potentially been compromised. Such an approach also ensures that each workspace is only encrypted using a workspace-specific key generated using a customer master key, providing the level of security offered and ensuring that no access to a prior workspace instance can result in compromising of a new workspace instance.

Figure 3A:
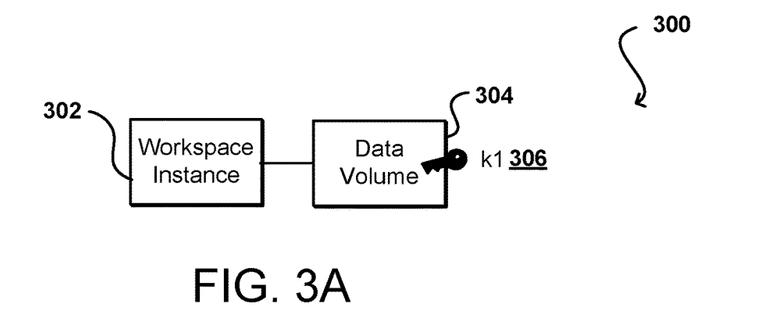
FIGS. 3A, 3B, and 3C illustrate an example process for providing an attached storage volume encrypted with a workspace-specific key that can be utilized in accordance with various embodiments.
Figure 3B:
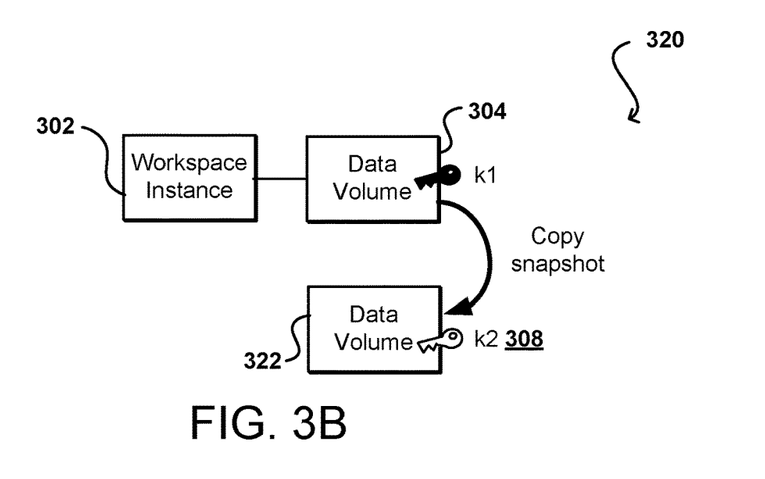
Figure 3C:
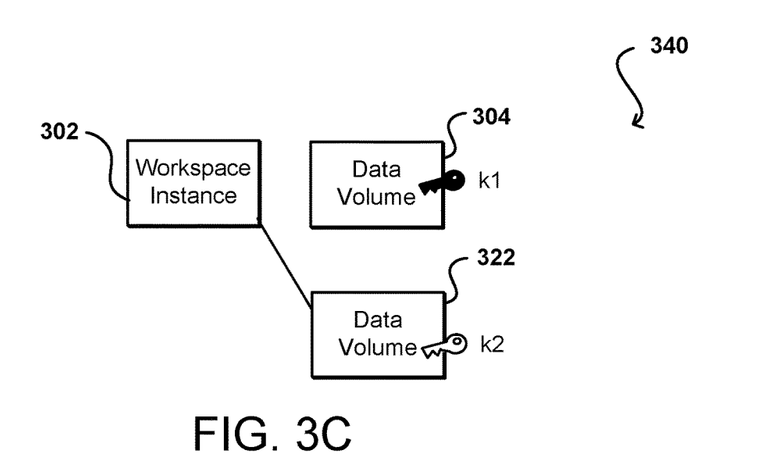

FIGS. 3A, 3B, and 3C illustrate stages of an example workspace creation workflow that can be utilized in accordance with various embodiments. In the example stage 300 illustrated in FIG. 3A, a workspace instance 302 is launched that is associated with a snapshot, such as a snapshot of data for a prior workspace instance or a snapshot for a default customer instance, among other such options. For example, a customer such as an enterprise might have an account with a workspace service, where users (e.g., employees) can obtain access credentials under the customer account. There might be a default instance associated with the customer account that is to be used to generate workspaces accessed under the customer account. This can help to ensure that, for example, all employees are running an approved operating system with the approved configuration, etc. As mentioned, the workspace will be associated with a machine image (or other such object) that includes metadata indicating how to build or allocate a data volume 304 for the workspace. The metadata can include a link, or other pointer or locator, to a snapshot for the workspace. In at least one embodiment, the snapshot will be encrypted under an existing data encryption key 306 that was generated using a customer master key on the account. The existing data encryption key 306 can be, for example, a key generated for a prior workspace instance that utilized the master key for the customer but a workspace context for the prior workspace. Accordingly, a data volume 304 allocated for the workspace and created using the snapshot will also be encrypted using the existing data encryption key 306, and in some embodiments may be decrypted using the existing data encryption key and stored under a separate key that may be independent of the customer master key. As discussed in more detail elsewhere herein, in at least some embodiments there can be at least two data volumes associated with a workspace instance, including a root volume for the operating system and a profile volume storing user profile information. In this example, the data volume 306 encrypted under the key 306 can be a root volume containing information for the operating system. When launching using a specific machine image the launch will occur, in at least this embodiment, using the same data encryption key currently associated with that machine image.

During the process of launching the virtual workspace instance 302, the snapshot used to create the initial data volume can be copied as illustrated in the example stage 320 of FIG. 3B. As part of the copy process in this example, a new data encryption key will be generated using the master key for the customer. The data key will be unique to this particular workspace, and should be created using a repeatable process in this example. Thus, the data encryption key can be created using what will be referred to herein as an encryption context. The context can contain information that is specific to the workspace, such that an entity having access to the workspace can submit a request to the key management service to receive a new key, or copy of the key, that corresponds to the customer master key and the encryption context. In one embodiment the context includes a unique string that is specific to the workspace. This can include, for example, a hash or function of one or more specific workspace properties, as may include a user identifier and a workspace identifier. The copy process can involve decrypting the original snapshot using the associated data encryption key, for example the previous or existing data encryption key, and then encrypting the new snapshot using the new data encryption key. The copy process can also involve pausing or stopping the instance such that no new data is obtained, or operations performed, that could be lost in the swapping of data volumes. A new data volume 322 can then be created that can store data for the workspace using the new copy of the snapshot encrypted under the new data encryption key 308. As illustrated in a final stage 340 of FIG. 3C, once the new data volume is created and available the data volumes can be swapped by detaching the old volume and attaching the new volume, such that the new data volume 322 encrypted under the new volume-specific data encryption key is associated with the workspace instance 302. The original volume 304 can then have the data deleted and be placed back into the data storage pool as available storage. The creation of a new volume and swapping of the volumes is performed since the creation of a new volume, such as the root volume, is created with a machine image corresponding to data encrypted under an existing key, as may have been associated with a previous workspace instance, but it is desired to utilize a root volume encrypted under a volume-specific key, at least in the example embodiment. The volume-specific data encryption key cannot be decrypted without information about the relevant workspace, used to determine the encryption context upon which the key is based. Thus, even if an entity obtains unauthorized access to the master key the entity will not be able to decrypt the workspace data without knowing the encryption context information. In order to create a key, an entity also has to have access to at least one valid customer credential, or assume a role associated with a customer credential, in order to enable the customer master key to be used to generate a new data encryption key. In many instances the profile volume may be encrypted under yet another encryption key separate from the root-volume specific key, as discussed elsewhere herein, which can help to further secure the workspace data. The profile volume key can be created using the customer master key or a separate customer key, which may be maintained by a key management service or otherwise obtained.

Any data transmitted between the customer instance 222 and the network-attached storage volume 230 for the workspace in this embodiment will pass through the storage client 224 to be encrypted using the volume-specific key. Data received to the instance can then be decrypted by the storage client 224 using the volume-specific key and passed to the operating system (or other appropriate destination). In at least some embodiments, a server hosting an instance, or a hypervisor or virtual machine associated with the instance, can perform the decryption and have access to the relevant key(s). In such cases, software on the server and separate from the instance can perform the encryption and decryption, rather than software running on the instance itself. The encryption on each read and write can then be performed at the block level in at least one embodiment. At least some amount of caching may be utilized such that a separate encryption and transmission is not performed for each individual read or write operation. Operations within the workspace instance 222 can be performed on the raw or unencrypted data. While discussed with respect to workspaces, it should be understood that encryption approaches discussed and suggested herein can be utilized with other applications and virtual environments as well within the scope of the various embodiments.

In at least some embodiments, workspaces can be shut down at the end of a customer session. Workspaces may also be shut down automatically after a period of inactivity or another such termination criterion. Termination in at least some embodiments can involve capturing a snapshot of the current state of the data, encrypting that snapshot under the current data encryption key, storing the snapshot to a determined location, then destroying the virtual machine instance and data volume, or at least scrubbing the instance and volume and making them available for use by other users, customers, or other such entities. When the workspace needs to be accessed again, such as upon a subsequent request from a valid user, a process such as those discussed herein can be utilized to allocate a new instance and attach a data storage volume encrypted under a volume-specific key.

Figure 4:
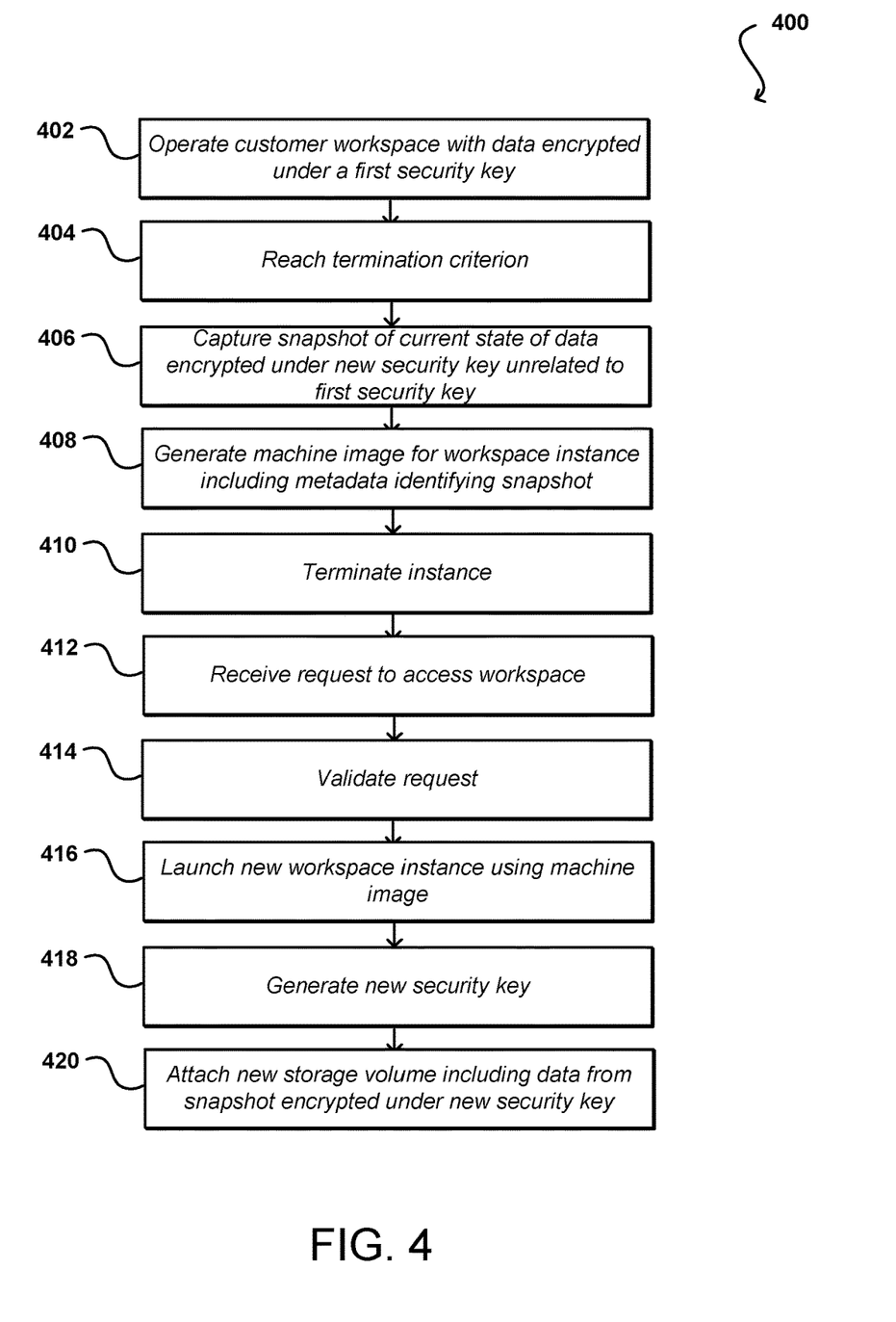
FIG. 4 illustrates an example process for managing workspace instances that can be utilized in accordance with various embodiments.

FIG. 4 illustrates an example process 400 for managing workspace instances that can be utilized in accordance with various embodiments. It should be understood for the various processes described herein that additional, fewer, or alternative steps can be performed in similar or alternative orders, or in parallel, within the scope of the various embodiments unless otherwise stated. In this example, a customer workspace is operated 402 with data encrypted using a first security key. The security key can be derived from a master key for the customer, and the workspace allocated for a user having access granted under the customer account. For example, the customer could be a company having a workspace account with the provider and the user could be an employee of the customer having access to a workspace under the customer account. The workspace can be operated using a virtual machine instance, or other computing resource instance, with network-attached storage, such as an attached block storage data volume. During operation, a termination criterion can be reached 404, such as in response to an explicit user-based instruction or in response to a period of inactivity, among other such options. As part of the termination, a snapshot can be captured 406 that represents the current state of the data for the workspace, where the data is encrypted under the first security key. A machine image can also be generated 408 for the workspace that includes metadata for building a workspace instance and an attached storage volume, where the metadata can also identify the snapshot for the workspace. The snapshot and machine image can be stored for the workspace, and the relevant resource instance terminated 410 or otherwise made available for other allocation, such as by scrubbing any data and configuration changes and placing the instance back in a pool of available computing resources.

Subsequently, a request can be received 412 to access the workspace. The request can be received from a console or through a workspace API, among other such options. The request can be from a single user wanted to access a workspace, where a new instance will need to be generated for the workspace, or a different user wanting to access a corresponding instance of the customer workspace, among other such options. The request can be validated 414, such as by verifying credentials associated with the customer account and verifying that the user is authorized to create and/or access the workspace. Once validated, a new workspace instance can be launched 416 using the stored machine image and an available virtual machine instance capable of being allocated for the workspace. A new security key can be generated 418 for the new workspace instance, where the new key can be based at least in part upon a master key for the customer account. A new storage volume can be allocated and attached 420 to the new workspace instance for use in storing data for the workspace. The new storage volume can be network-attached storage, and can include data encrypted under the new security key. A storage manager, for example, on the workspace instance or on the resource running the instance, can cause any data transmitted between the instance and the storage volume to be encrypted under the new security key, but transmitted to the operating system without such encryption.

Figure 5:
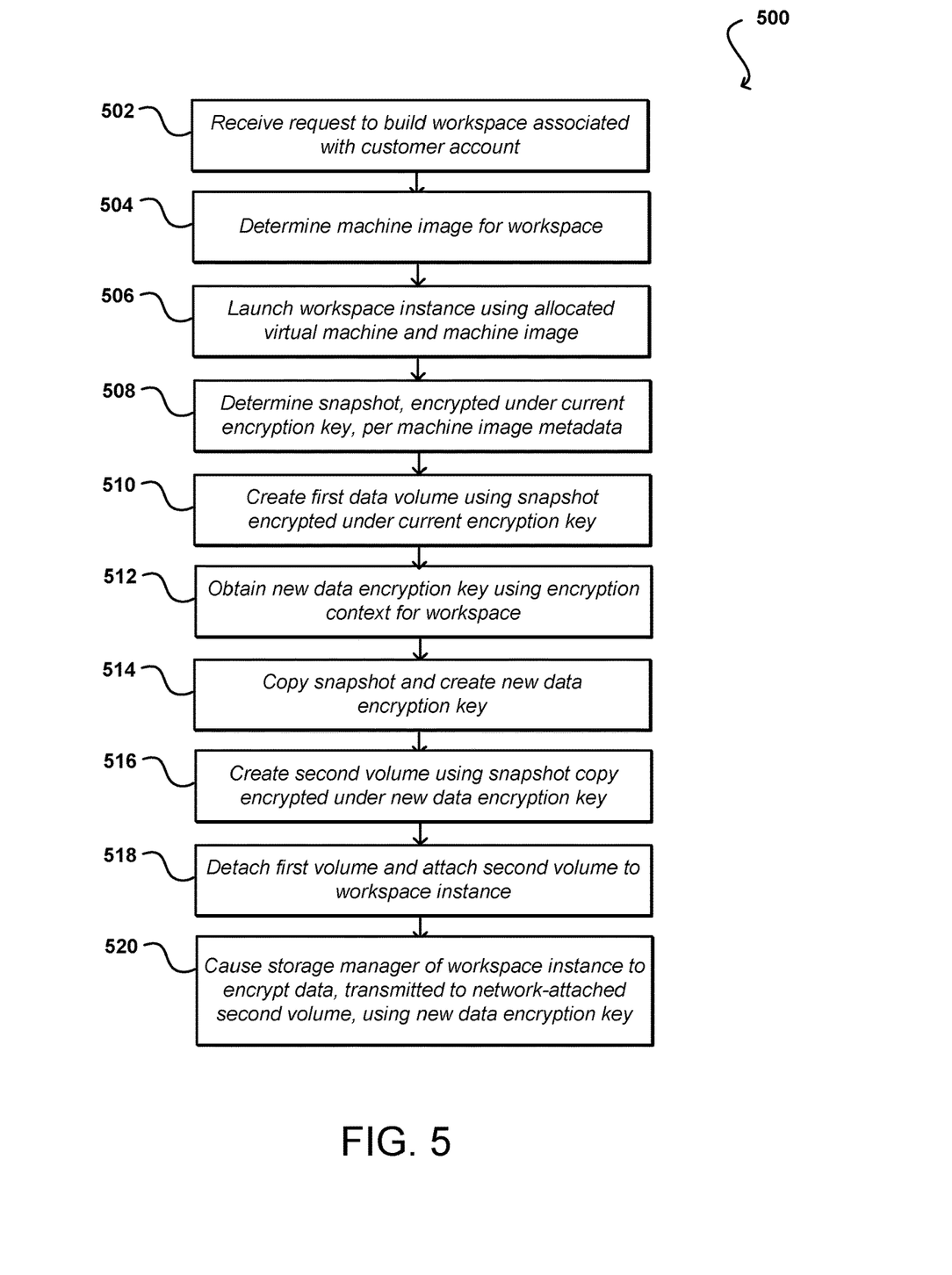
FIG. 5 illustrates an example process for building a workspace instance that can be utilized in accordance with various embodiments.

FIG. 5 illustrates an example process 500 for managing workspace encryption keys that can be utilized in accordance with various embodiments. In this example, a request to build a workspace is received 502, where the request is associated with a customer account. The account can be with a resource provider associated with a multi-tenant environment, for example, and a user submitting the request can have access granted under the customer account. In order to generate the virtual workspace, a machine image can be determined 504 that is to be used for the workspace. As mentioned, this can be a default workspace for the customer account or a machine image associated with a previous workspace session for the requesting user, among other such options. A new workspace instance can be launched 506, in this example by allocating a virtual machine instance and configuring the instance using the determined machine image. The instance can be stopped or paused in order to prevent data from being modified that will not be represented in the subsequently captured snapshot. A snapshot associated with the workspace can be determined 508, such as by a link included in the metadata of the machine image. The snapshot can include a default snapshot for the customer account or a snapshot captured for a prior workspace session for the user or the specific workspace, among other such options. The snapshot, which can be a copy of the snapshot as discussed elsewhere herein, can also be encrypted under a first data encryption key, which can be generated using the master key or may be unrelated to the master key in at least some embodiments.

A first data volume, such as a network-attached block storage volume, can be created 510 using a copy the snapshot encrypted under the associated encryption key. In order to obtain a data volume encrypted under a volume-specific encryption key, a new data encryption key can be obtained 512 using workspace context for the current workspace. As mentioned, this can include sending a value, such as a hash of one or more workspace values, to a key management service along with access credentials associated with the customer account. The new encryption key can then be generated based upon a master key for the customer and the encryption context. The snapshot can be copied 514 and encrypted under the new encryption key. A second data volume can be created 516 using the snapshot, where the data stored to the second data volume will be encrypted under the volume-specific new encryption key. This can be done, for example, such that only the new data encryption key is used for the workspace and no prior workspace key, which may have been compromised, is associated with the new workspace instance. The first volume can be detached 518 from the workspace instance and the new data volume attached for use by the workspace. The workspace instance can be started or resumed, and the workspace instance can be caused 520 to encrypt data, transmitted to the network-attached second storage volume, using the new data encryption key. The new encryption key can also be used to decrypt data received from the new storage volume, such as may be used in the workspace or transmitted to the operating system, etc.

Figure 6:
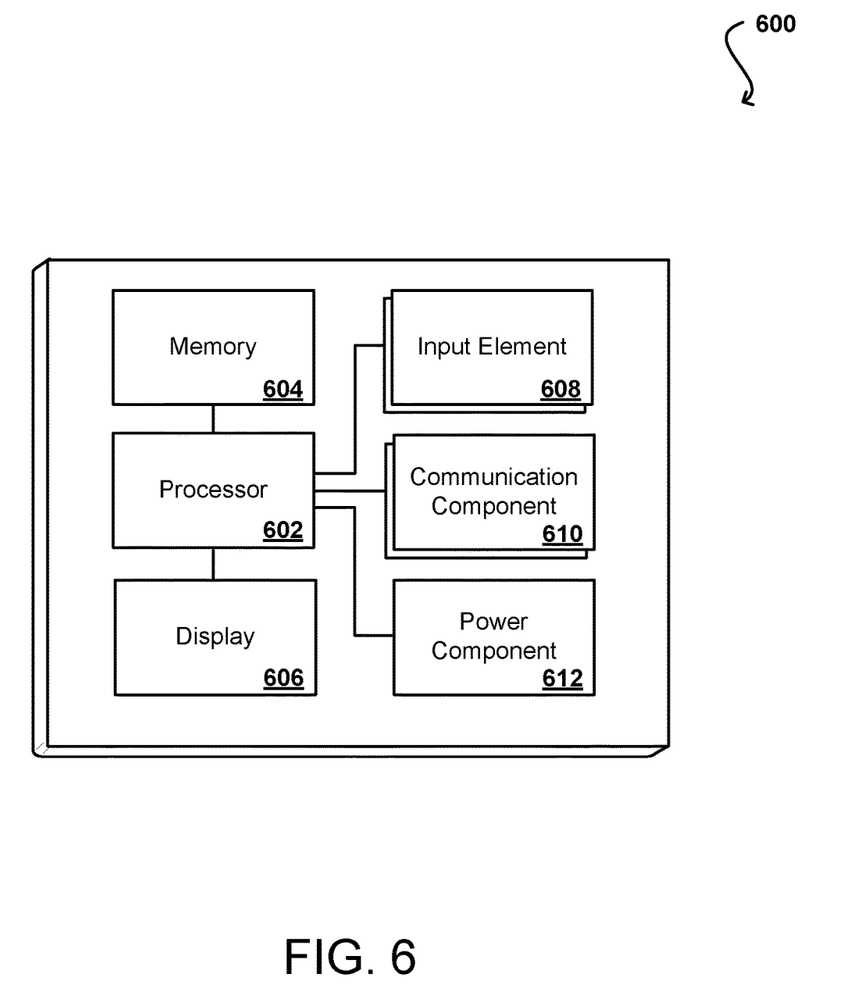
FIG. 6 illustrates components of an example computing device that can be used to perform aspects of the various embodiments.

FIG. 6 illustrates a logical arrangement of a set of general components of an example computing device that can be used to implement aspects of the various embodiments. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device may include some type of display element 606, such as a touch screen or liquid crystal display (LCD), although devices such as portable media players might convey information via other means, such as through audio speakers. In some embodiments, the computing device 600 can include one or more networking and/or communication elements 608, such as a Wi-Fi, Bluetooth, RF, wired, or wireless communication system. The device in many embodiments can communicate with a network, such as the Internet, and may be able to communicate with other such devices. In some embodiments the device can include at least one additional input component 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 612, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a user request to access a workspace, the user request associated with a user having access credentials under a customer account with a provider of a multi-tenant environment;
   allocating a virtual machine instance to execute the workspace, the virtual machine instance being configured using a machine image for the workspace and provided using a physical resource of the multi-tenant environment;
   allocating a first storage volume for the workspace, the first storage volume provided using a network-attached, block-based storage system of the multi-tenant environment, the first storage volume encrypted using a first data encryption key and storing data from a workspace snapshot identified by the machine image;
   creating a copy snapshot corresponding to the workspace snapshot;
   obtaining a new data encryption key using a current workspace context and the master key for the customer account;
   allocating a second storage volume for the workspace using the network-attached, block-based storage system, the second storage volume encrypted using the new data encryption key and storing data from the copy snapshot; and
   causing the second storage volume to be attached to the virtual machine instance for the workspace, wherein a storage manager for the workspace is able to encrypt transmissions of data between the virtual machine instance and the second storage volume using the new data encryption key that is specific to the current workspace context.

2. The computer-implemented method of claim 1, further comprising:
   determining context information for the workspace, the context information including one or more values for identified workspace parameters; and
   generating a hash of the context information to obtain the current workspace context.

3. The computer-implemented method of claim 1, further comprising:
   sending the current workspace context to a key management service storing the master key for the customer account, the master key unexportable from the key management service, wherein the key management service is enabled to generate the new data encryption key using the master key and the current workspace context.

4. The computer-implemented method of claim 1, further comprising:
pausing the virtual machine instance before creating the copy snapshot; and
resuming the virtual machine instance after the second storage volume is attached to the virtual machine instance.

5. A computer-implemented method, comprising:
receiving a request to access a virtual desktop, the virtual desktop executing on a compute instance in a multi-tenant environment, the compute instance associated with a machine image;
allocating the compute instance, the compute instance configured according to the machine image;
allocating a first storage volume using a network-attached storage resource of the multi-tenant environment, the first storage volume encrypted using a first encryption key and associated with data from a stored snapshot corresponding to the machine image;
creating a copy snapshot corresponding to the stored snapshot;
obtaining a new encryption key using information about the compute instance;
allocating a second storage volume using the network-attached storage resource, the second storage volume encrypted using the new encryption key and storing data from the copy snapshot; and
causing the second storage volume to be attached to the compute instance, wherein transmissions between the compute instance and the second storage volume are encrypted using the new encryption key.

6. The computer-implemented method of claim 5, further comprising:
determining context information for the compute instance, the context information including one or more values for identified instance parameters; and
generating a hash of the context information to obtain the information about the compute instance used to obtain the new encryption key.

7. The computer-implemented method of claim 6, further comprising:
determining the context information using values for the identified instance parameters associated with the virtual desktop.

8. The computer-implemented method of claim 6, further comprising:
sending the information to a key management service storing a master key for customer generates the new encryption key using the master key and the information about the compute instance.

9. The computer-implemented method of claim 5, further comprising:
determining the machine image associated with the compute instance, the machine image being a default machine image for generating compute instances associated with a customer account or a prior machine image generated using a prior compute instance associated with the customer account.

10. The computer-implemented method of claim 5, wherein the stored snapshot represents a state of data for a prior version of the virtual desktop executing on the compute instance.

11. The computer-implemented method of claim 5, wherein the transmissions between the compute instance and the second storage volume are encrypted, and wherein transmissions from the compute instance to the operating system are not encrypted using the new encryption key.

12. The computer-implemented method of claim 5, further comprising:
detecting satisfaction of a termination criterion for the compute instance;
capturing a final snapshot of the second storage volume;
generating a new machine image corresponding to the compute instance; and
terminating the compute instance, wherein the final snapshot and the new machine image are capable of being used to generate a new compute instance in the multi-tenant environment.

13. The computer-implemented method of claim 5, further comprising:
generating a respective data encryption key for each storage volume allocated in the multi-tenant environment and associated with a customer account.

14. The computer-implemented method of claim 5, further comprising:
pausing the compute instance before creating the copy snapshot; and
resuming the compute instance after the second storage volume is attached to the compute instance.

15. A system, comprising:
at least one processor; and
memory including instructions that, when executed by the at least one processor, cause the system to:
receive a request to access a virtual desktop, the virtual desktop executing on a compute instance in a multi-tenant environment, the compute instance associated with a machine image;
allocate the compute instance, the compute instance configured according to the machine image;
allocate a first storage volume using a network-attached storage resource of the multi-tenant environment, the first storage volume encrypted using a first encryption key and associated with data from a stored snapshot corresponding to the machine image;
create a copy snapshot corresponding to the stored snapshot;
obtain a new encryption key using information about the compute instance;
allocate a second storage volume using the network-attached storage resource, the second storage volume encrypted using the new encryption key and storing data from the copy snapshot; and
cause the second storage volume to be attached to the compute instance, wherein transmissions between the compute instance and the second storage volume are encrypted using the new encryption key.

16. The system of claim 15, wherein the instructions when executed further cause the system to:
determine context information for the compute instance, the context information including one or more values for identified instance parameters; and
generate a hash of the context information to obtain the information about the compute instance used to obtain the new encryption key.

17. The system of claim 15, wherein the instructions when executed further cause the system to:
send the information to a key management service storing a master key for customer account associated with the request, wherein the key management service generates the new encryption key using the master key and the information about the compute instance.

18. The system of claim 15, wherein the instructions when executed further cause the system to:
- determine the machine image associated with the compute instance, the machine image being a default machine image for generating compute instances associated with a customer account or a prior machine image generated using a prior compute instance associated with the customer account.

19. The system of claim 15, wherein the instructions when executed further cause the system to:
- detect satisfaction of a termination criterion for the compute instance;
- capture a final snapshot of the second storage volume;
- generate a new machine image corresponding to the compute instance; and
- terminate the compute instance, wherein the final snapshot and the new machine image are capable of being used to generate a new compute instance in the multi-tenant environment.

20. The system of claim 15, wherein the instructions when executed further cause the system to:
- pause the compute instance before creating the copy snapshot; and
- resume the compute instance after the second storage volume is attached to the compute instance.

* * * * *